United States Patent
Stonecypher

(10) Patent No.: US 7,156,532 B2
(45) Date of Patent: Jan. 2, 2007

(54) BLIND SPOT CURVED MIRROR

(76) Inventor: Bob Bernard Stonecypher, 1383 Fahlander Dr. S., Columbus, OH (US) 43229

( * ) Notice: Subject to any disclaimer, the term of this patent is extended or adjusted under 35 U.S.C. 154(b) by 0 days.

(21) Appl. No.: 11/455,527

(22) Filed: Jun. 20, 2006

(65) Prior Publication Data

US 2006/0238906 A1 Oct. 26, 2006

(51) Int. Cl.
G02B 5/08 (2006.01)

(52) U.S. Cl. ........................................ 359/865; 248/481

(58) Field of Classification Search ................. None
See application file for complete search history.

(56) References Cited

U.S. PATENT DOCUMENTS

| 4,331,382 | A |   | 5/1982 | Graft |
| 4,890,908 | A | * | 1/1990 | Casey ......................... 359/865 |
| 4,906,088 | A | * | 3/1990 | Casey ......................... 359/865 |
| 5,005,962 | A |   | 4/1991 | Edelman |
| 5,500,766 | A |   | 3/1996 | Stonecypher |
| 5,784,211 | A |   | 7/1998 | Mingledorff |
| 6,015,215 | A |   | 1/2000 | Herman |
| 6,056,411 | A | * | 5/2000 | Blevins ....................... 359/838 |
| 6,523,965 | B1 |  | 2/2003 | Luger |
| 2003/0039039 | A1 | | 2/2003 | Thomas et al. |

FOREIGN PATENT DOCUMENTS

| EP | 0 310 261 A1 * | 4/1989 |
| JP | 10278677 A * | 10/1998 |

* cited by examiner

Primary Examiner—Drew A. Dunn
Assistant Examiner—Derek S. Chapel

(57) ABSTRACT

The Blind Spot Curved Mirror reflector has a constant radius curve from top to bottom, and straight from left to right sides, as a section of a cylinder. The outer shell has a section removed for installation alignment on an original equipment outer shell. The removed section form's a basic alignment for a vehicle driver's blind spot area. The blind spot curved mirror will image the same area as a larger flat mirror with a smaller profile. The smaller profile will restrict less vision area than a larger flat mirror. The blind spot curved mirror with it's outer shell may be attached to an existing side mirror as an auxiliary mirror or included in an original equipment mirror outer shell with the original flat mirror and give the same blind spot effect.

1 Claim, 6 Drawing Sheets

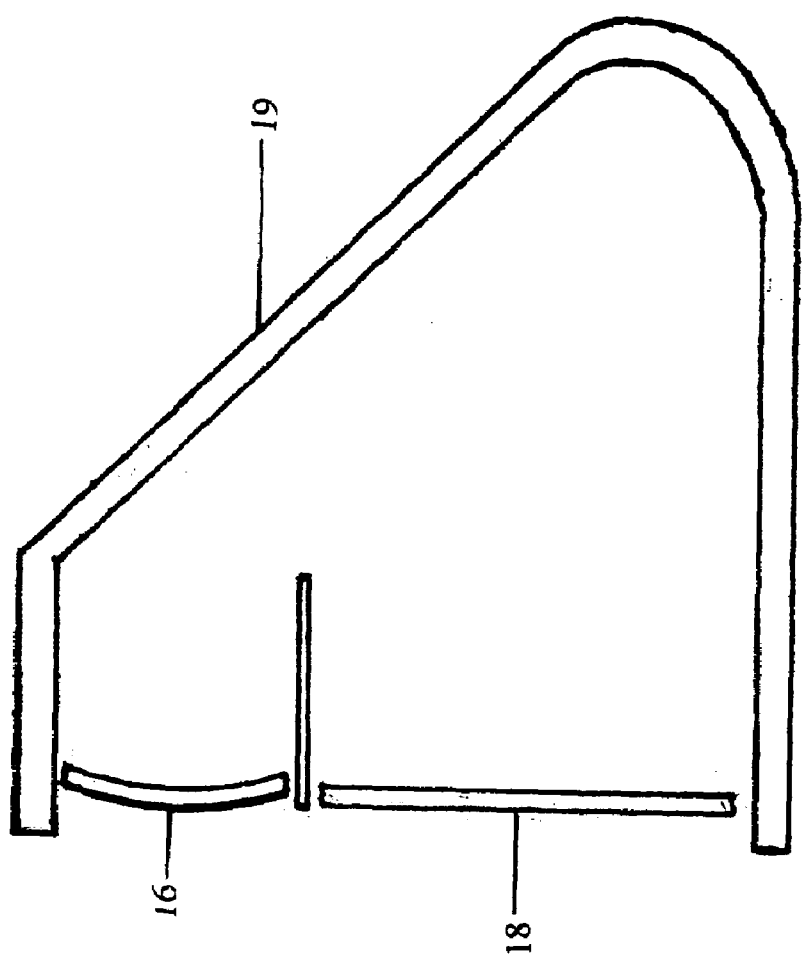

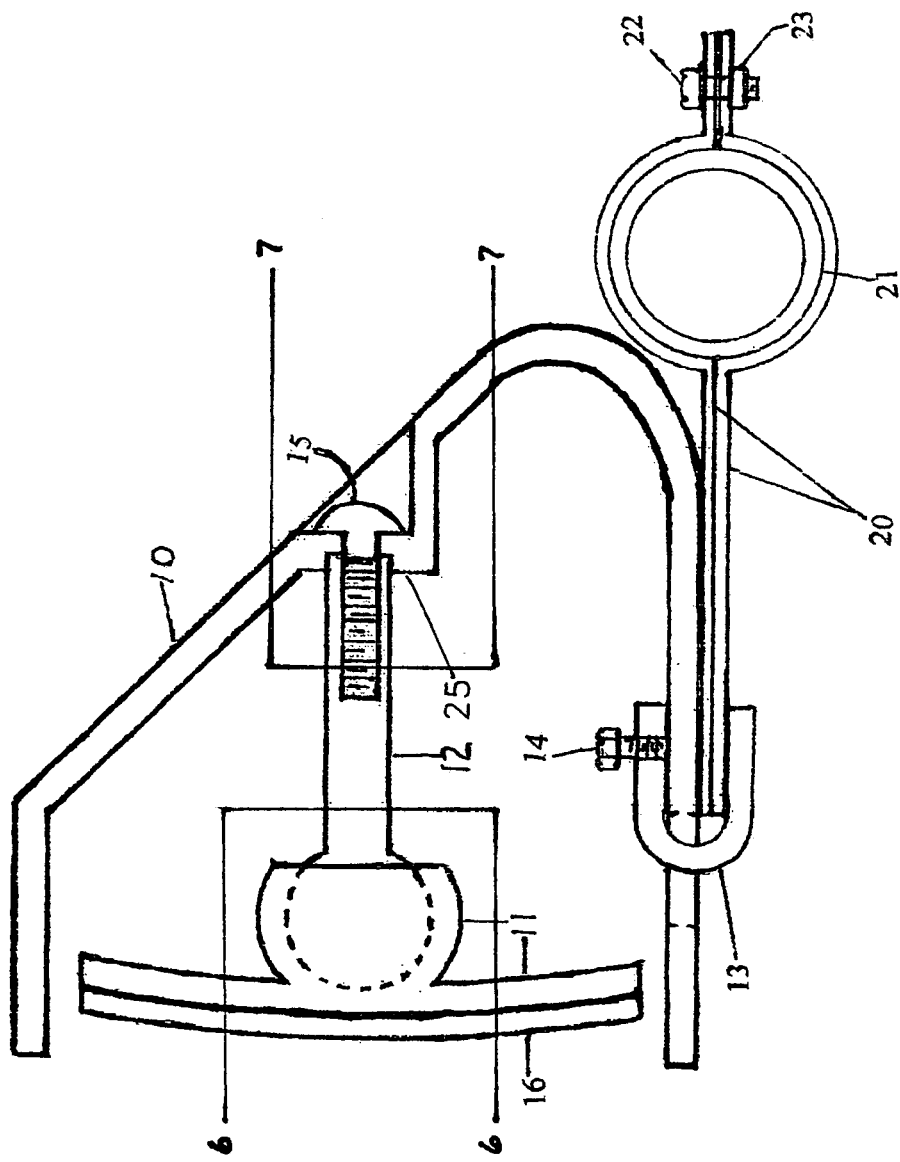
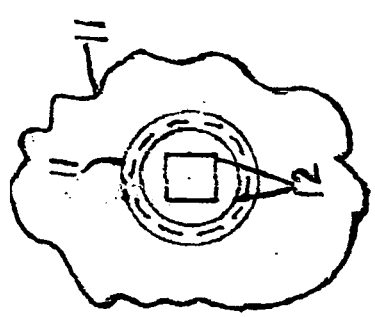
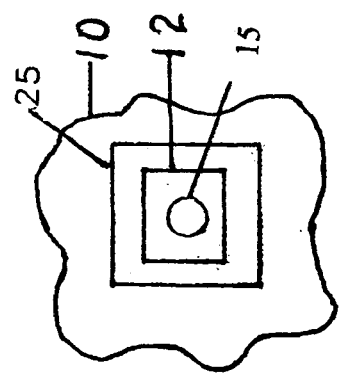

BLIND SPOT CURVED MIRROR

PURPOSE OF INVENTION

Prevent vehicle accidents and preserve life and property.

FIELD OF INVENTION

The area to the rear and sides of a motor vehicle between the rear view mirror image and a drivers peripheral vision that cannot be seen by the driver is known as the blind spot. The present invention relates to transportation safety, recreation safety, commercial vehicle safety and preservation of life and property. Accident records report there are approximately 600,000 accidents annually in the United States attributed to the drivers not knowing what is in their immediate blind spot. The blind spot curved mirror will image only the blind spot when installed and adjusted correctly for a particular driver.

SUMMARY OF THE INVENTION

It is an object of the invention to provide a means of eliminating the blind spot of motor vehicle drivers. The blind spot curved mirror makes the blind spot visible to a vehicle driver without the driver turning his/her vision away from forward traffic. It is another object of the invention to prevent accidents on the streets, roads, highways and waterways. It is another object of the invention to aid a truck driver with better vision of his/her immediate surroundings. It is another object of the invention to preserve life and property.

BACKGROUND: DESCRIPTION OF PROBLEM

Most vehicle drivers have experienced near accidents and/or accidents when changing direction or driving lanes or entering a freeway or other traffic lanes. This hazard exists mainly because the vehicle driver is unaware of the occupancy in their blind spot. To enter traffic in the blind spot area a driver must look into an existing rear view mirror with limited area viewing or a convex blind spot mirror that does not give a true position of an object in the mirror, turn their head and look away from forward traffic or assume there are no other vehicles in the blind spot. Either decision creates a possible accident. In warm weather water ways are becoming almost as crowded as streets and highways and accidents are almost as common. A boat driver must be aware of other objects in his/her blind spot the same as road drivers, especially when pulling water skiers. It is very important to know where the skiers are at all times, as well as any hazards for the boat and skier. The blind spot curved mirror, in addition to the regular rear view mirror, will keep the skier and other objects in the boat drivers vision at all times. The trucking industry drivers have an additional blind spot to the traffic lanes and side blind spot. That additional blind spot is low and close to the truck. The original equipment mirror image does not image the objects low and close to the truck. The convex mirrors being used for this purpose will image the objects but they appear to be smaller and at a greater distance than is true. The position of these objects are confusing with the convex mirrors and nonexisting with flat mirrors.

OTHER SOLUTIONS

A flat mirror that will image the blind spot and rear view is large enough to restrict a drivers real time side and forward vision, causing a different hazzard to which there is no practical solution. A convex mirror will image large areas, but leave the position of the object imaged in the convex mirror unknown. A driver may turn his/her eyes from forward traffic to look into the blind spot, creating another hazard, or assume there are no one in the blind spot and hope if there are other drivers they will have good brakes and use them. Vehicle rear view mirrors either do not view large enough areas or too large of area. The flat left side original vehicle mirror does not image the blind spot. The convex right side mirror and other convex mirror images are confusing as to the location and distance of the object and what is shown because of the enlarged area and small images. Truck mirrors either do not image an object or leaves the location of the object unknown. The blind spot curved mirror eliminates the blind spot area. With the knowledge of the image being only in the blind spot, a driver does not have to calculate the position of an image in the mirror.

INVENTION DESCRIPTION

In accordance with the present invention, there is provided a safety feature for road and water vehicles. The blind spot curved mirror is independent of original equipment mirrors and may be either an auxiliary mirror with it's outer shell attached to an original equipment rear view mirror or other object, or an additional mirror made in the same outer shell with a flat mirror for motor vehicle original equipment. This blind spot curved mirror will easily lend itself to position adjustment by remote control, either electrical or mechanical, or remain as hand adjusted. The Blind spot curved mirror is curved from top to bottom, and straight from left to right sides, as a section of a cylinder, allowing the blind spot curved mirror to image only the blind spot. Being properly installed and adjusted to the vehicle driver, when an object is observed in the blind spot curved mirror the vehicle driver will know it is in the blind spot. Having a horizontal planar reflecting surface in conjunction with the existing rear view mirror will provide a vehicle driver a clear view of his/her rear view and blind spot. When a vehicle becomes visible in the original rear view side mirror and it's driver decides to pass, as the passing vehicle approaches, its image leaves the original equipment rear view side mirror as the vehicle enters the blind spot where it then becomes visible in the blind spot curved mirror. Continuing to pass, the image remains in the blind spot curved mirror until leaving the blind spot area where the vehicle becomes visible in a drivers peripheral vision. Thus the vehicle was never out of the view of the driver being passed and the driver never lost sight of forward traffic. Likewise, a vehicle driver decides to change lanes or pass another vehicle. Looking into the original equipment side mirror and the blind spot curved mirror and seeing another vehicle in his/her blind spot the driver remains in the some lane until it is safe to change lanes. A driver may look into the original equipment mirror and the blind spot curved mirror and see no other vehicle in the area, knowing there is no hazzard to changing lanes, the driver safely proceeds. The blind spot curved mirror will show a true width horizontal image size and the true horizontal position of another vehicle in the blind spot area. The image in the blind spot curved mirror is shorter in height than is real, but its width and position are true.

BRIEF DESCRIPTION OF DRAWINGS

FIG. 1 also shows the viewing planes of FIG. 2 and FIG. 3.

FIG. 5 is an illustration of how the blind spot curved mirror reflector 16 and an original equipment flat mirror 18 could be integrated into one mirror outer shell 19 as an original equipment mirror.

FIG. 6 is showing the blind spot curved mirror positioning ball and stem 12, mounted in the blind spot curved mirror support and positioning socket 11 looking aft from inside the blind spot curved mirror outer shell 10.

FIG. 7 is showing the mount socket 25 on the forward inside wall of the blind spot curved mirror outer shell 10 provided for mounting the blind spot curved mirror positioning ball and stem 12.

FIG. 8 is a side view showing the blind spot curved mirror outer shell 10, blind spot curved mirror reflector 16, blind spot curved mirror support and positioning socket 11, blind spot positioning ball and stem 12, mount socket 25 for the blind spot curved mirror positioning ball and stem 12, blind spot curved mirror mount screw 15, all affixed to the two piece symmetrical mount adapter 20 using the blind spot curved mirror mount clamp 13 and blind spot curved mirror mount screws 14 which is secured to object 21 using universal mount adapter bolt 22 and universal mount adapter nut 23 for objects other than the original equipment mirror outer shell 17 and original equipment mirror 18.

DETAILED DESCRIPTION OF DRAWINGS

A complete understanding of the invention may be obtained by reference to the accompanying drawings, when considered in conjunction with the subsequent detailed description.

Figure 1:
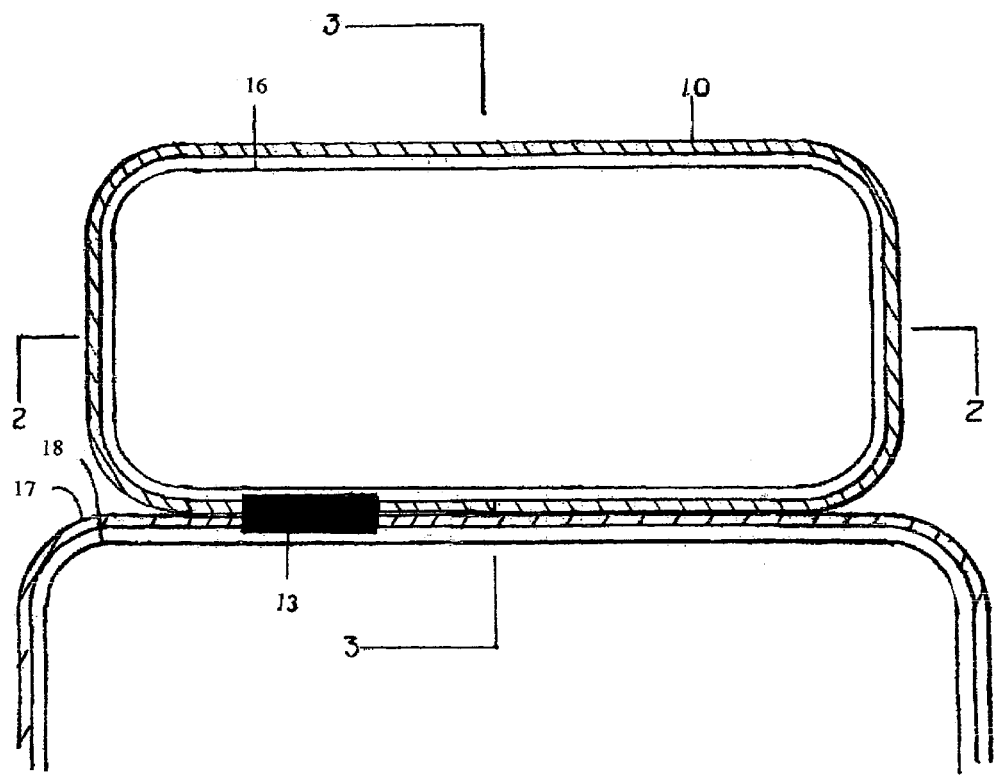
FIG. 1 is a front view of the blind spot curved mirror reflector 16, blind spot curved mirror outer shell 10, blind spot curved mirror mount clamp 13, original equipment mirror outer shell 17 and original equipment mirror reflector 18.

FIG. 1 is a front view of the blind spot curved mirror assembly showing the blind spot curved mirror reflector 16, blind spot curved mirror outer shell 10, mounted on original equipment side mirror outer shell 17 and original equipment side mirror reflector 18. Using blind spot curved mirror mount clamp 13, FIG. 1 also shows the viewing planes of FIG. 2 and FIG. 3. The blind spot curved mirror reflector 16 is curved in the top to bottom vertical plane and straight in the left to right horizontal plane. This extends the image of the original equipment mirror reflector 18 to the drivers peripheral vision area, eliminating the blind spot. When an object is observed in the blind spot curved mirror reflector 16 the vehicle driver will know that object is in his/her blind spot. The top to bottom vertical curve will present a wider vertical image allowing the driver to see objects low to the ground such as curbs and higher above the ground such as bottom of truck trailers. This curve does shorten the vertical appearance of imaged objects.

Figure 2:
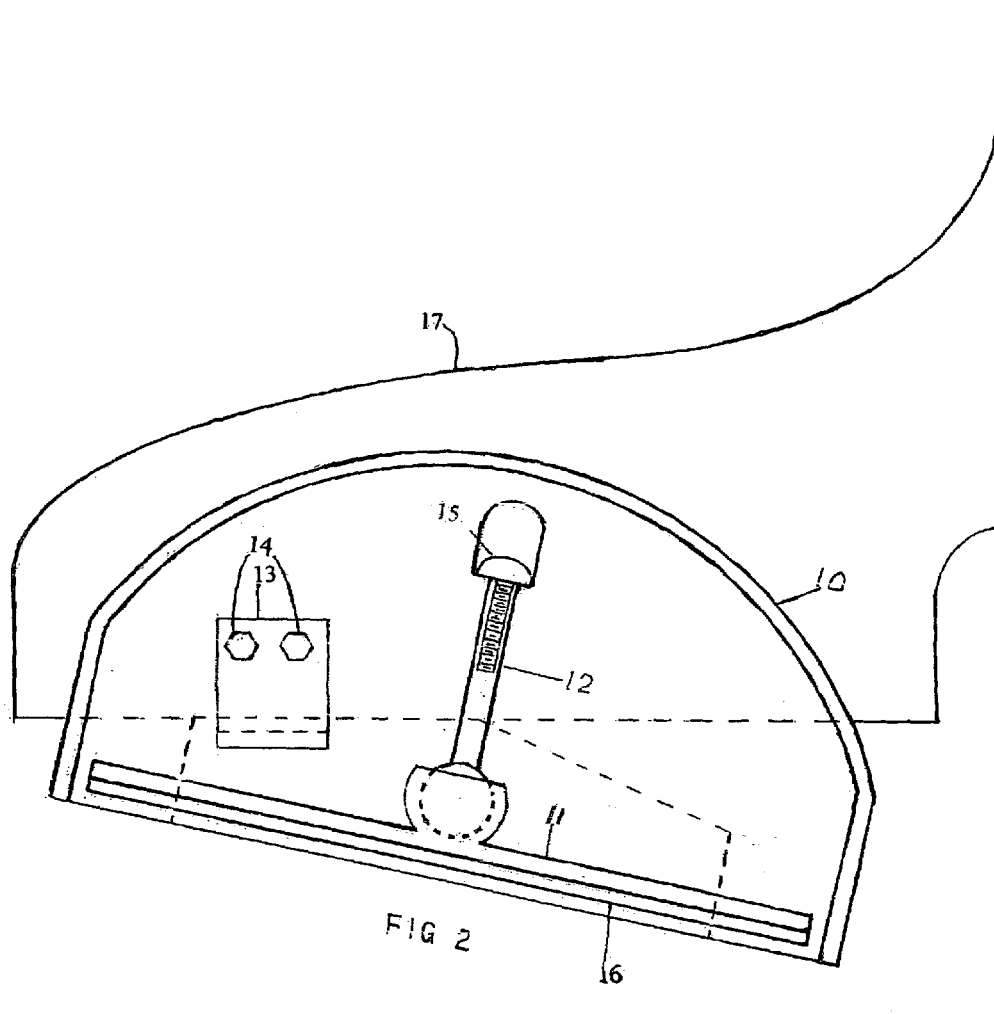
FIG. 2 is a top view of the blind spot curved mirror showing the blind spot curved mirror outer shell 10, blind spot curved mirror reflector 16, blind spot curved mirror support and positioning socket 11, blind spot curved mirror positioning ball and stem 12, blind spot curved mirror mount clamp 13 and blind spot curved mirror mount screws 14, and blind spot curved mirror mount screw 15, FIG. 2 also shows the mounting position of blind spot curved mirror outer shell 10 mounted on the original equipment mirror outer shell 17.

FIG. 2 is a top view showing the blind spot curved mirror outer shell 10, blind spot curved mirror reflector 16, blind spot curved mirror support and positioning socket 11, blind spot curved mirror positioning ball and stem 12, blind spot curved mirror mount screw 15, blind spot curved mirror mount clamp 13 and blind spot curved mirror mount clamp screws 14.

Figure 4:
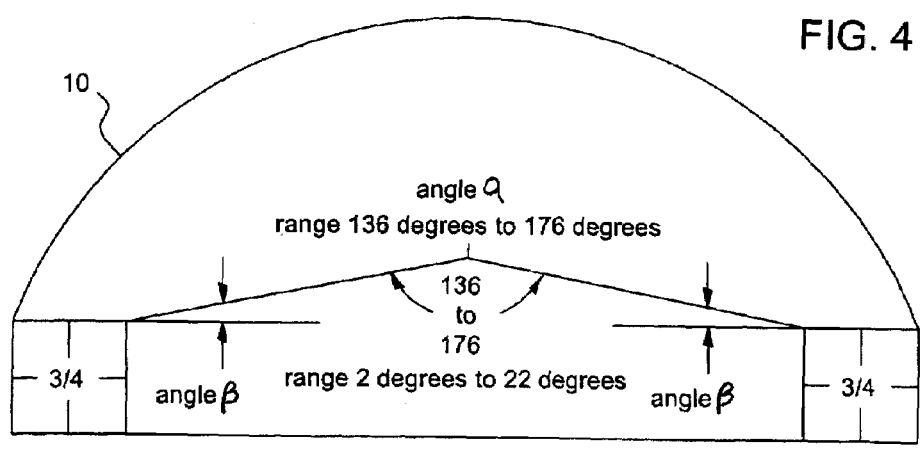
FIG. 4 is a bottom view of blind spot curved mirror outer shell 10 showing the setback cutout of ¾ inch from the trailing edge of the bottom surface forming angles α and β from the trailing edge of blind spot curved mirror outer shell 10.

FIG. 2 is also showing the mounting position and arrangement of the left blind spot curved mirror outer shell 10 relative to the original equipment mirror outer shell 17. To mount the blind spot curved mirror assembly on an automobile, remove the blind spot curved mirror mounting screw 15 using a proper tool, then remove the blind spot curved mirror reflector 16, the blind spot curved mirror support and positioning socket 11 and the blind spot curved mirror positioning ball and stem 12 using hands, from the blind spot curved mirror outer shell. (Do not separate the elements) The floor (lower surface) of blind spot curved mirror outer shell 10 has a section removed from the floor to provide a basic mounting position that will form a wide V with angles angle α and angle β. The apex of angle α is about 136 degrees to about 176 degrees and angle β's apex is about 2 degrees to about 22 degrees from the base of each segment of angle α as shown in FIG. 4. Each segment of angle α provides a basic alignment aiming of blind spot curved mirror outer shell 10 to the blind spot area by placing a segment of angle α aligned with the trailing edge of original equipment mirror 17 as shown in FIG. 2. To install the left blind spot curved mirror, aline the left segment of angle α in the lower surface of blind spot curved mirror outer shell 10 with the trailing edge of the left original equipment side mirror outer shell 17, place the blind spot curved mirror mount clamp 13 over the trailing edges of blind spot curved mirror outer shells 10 and original equipment side mirror outer shell 17, then secure the two outer shells together by installing and torqueing the blind spot curved mirror mount clamp screws 14 to a torque that will keep the blind spot curved mirror outer shell 10 in place against the wind pressure when traveling at freeway speed. Use caution when torqueing blind spot curved mirror mount clamp screws 14 as over torqueing can damage the blind spot curved mirror outer shells 10 and original equipment side mirror outer shell 17. When the blind spot curved mirror outer shell 10 is secured to the original equipment side mirror outer shell 17 reinstall the blind spot curved mirror reflector 16, the blind spot curved mirror support and positioning socket 11, the blind spot curved mirror positioning ball and stem 12 using hands then the blind spot curved mirror mounting screw 15 using an appropriate tool, being careful to not over torque the blind spot curved mirror mount screw 15. The right side blind spot curved mirror installation will be a mirror image of the left side mirror installation. When the blind spot curved mirror support and positioning socket 11 with blind spot curved mirror reflector 16 are assembled with blind spot curved mirror positioning ball and stem 12 reinstalled into blind spot curved mirror outer shell 10 and secured to the original equipment side mirror 17, the vehicle driver is to take his/her normal driving position in the drivers seat. On the same horizontal plane, position the blind spot curved mirror reflector 16 where the inboard edge will image part of the object imaged in the outboard edge of the original equipment mirror reflector 18 making sure the planes in both mirrors remain constant and in line will assure the vehicle driver of the proper position of the blind spot curved mirror to eliminate the blind spot.

The blind spot curved mirror reflector 16 is to be attached to the blind spot curved mirror support and positioning socket 11 with an appropriate weather proof bonding compound or another suitable method. The friction between the blind spot curved mirror support and positioning socket 11 and blind spot curved mirror positioning ball and stem 12 are to be great enough to maintain the blind spot curved mirror reflector set position against the wind pressure at freeway speeds.

Figure 3:
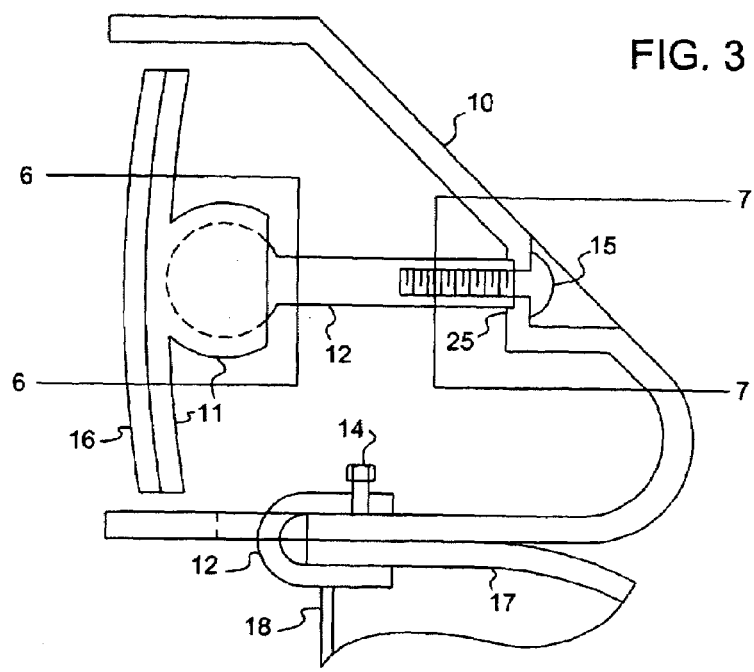
FIG. 3 is a side view of the blind spot curved mirror showing the blind spot curved mirror outer shell 10, blind spot curved mirror reflector 16, blind spot curved mirror support and positioning socket 11, blind spot curved mirror positioning ball and stem 12, blind spot curved mirror mount socket 25 for alining and positioning the blind spot curved mirror ball and stem 12, blind spot curved mirror mount screw 15, mounted on the original equipment mirror outer shell 17 and original equipment mirror reflector 18 using the blind spot curved mirror mount clamp 13 with blind spot curved mirror mount clamp screws 14.

FIG. 3 is a side view of blind spot curved mirror assembly showing the blind spot curved mirror outer shell 10, blind spot curved mirror reflector 16, blind spot curved mirror support and positioning socket 11, blind spot curved mirror positioning ball and stem 12, mount socket 25 for the blind spot curved mirror positioning ball and stem 12, blind spot curved mirror mounting screw 15, the original equipment side mirror outer shell 17, original equipment side mirror reflector 18, blind spot curved mirror mount clamp 13 and blind spot curved mirror mount clamp screw 14. FIG. 3 also is showing plane level for FIG. 6 and FIG. 7. FIG. 3 illustrates the assembly of the blind spot curved mirror elements of blind spot curved mirror reflector 16 appropriately attached to blind spot curved mirror support and socket 11 mounted on the blind spot curved mirror positing ball and stem 12 in the mount socket 25 for the blind spot curved mirror positioning ball and stem 12, secured to the blind spot curved mirror outer shell 10 using the blind spot curved mirror mount screw 15. This assembly is further attached to the original equipment side mirror outer shell 17 using the blind spot curved mirror mount clamp 13 and secured with the blind spot curved mirror mount clamp screws 14 using the proper tools.

FIG. 4 is a bottom view of blind spot curved mirror outer shell 10 showing the setback cutout of ¾ inch from the trailing edge of the blind spot curved mirror outer shell 10 to form the base of angles α and β. The apex of angle α is about 136 degrees to about 176 degrees the apex of angle B is about 2 degrees to about 22 degrees from each segment of angle α. Each segment of angle α provides a rough alignment aiming of blind spot curved mirror outer shell 10 to the blind spot area by placing a segment of angle α aligned with the trailing edge of original equipment mirror 17 as shown in FIG. 2.

FIG. 5 is an illustration of how the blind spot curved mirror reflector ~16 and an original equipment flat mirror 18 could be integrated into one mirror shell 19 as an original equipment mirror.

FIG. 6 is a view showing the blind spot curved mirror positioning ball and stem 12, mounted in the blind spot curved mirror support and positioning socket 11 looking toward the rear of the vehicle from the inside of the blind spot curved mirror outer shell 10.

FIG. 7 is showing the mounting socket 25 for the blind spot curved mirror positioning ball and stem 12 on the inside wall of the blind spot curved mirror outer shell 10 and blind spot curved mirror mount screw 15 for mounting the blind spot curved mirror positioning ball and stem 12.

FIG. 8 is a side view of the blind spot curved mirror assembly showing the blind spot curved mirror outer shell 10, blind spot curved mirror reflector 16, blind spot curved mirror support and positioning socket 11, blind spot curved mirror positioning ball and stem 12, mount socket 25 for the blind spot curved mirror positioning ball and stem and blind spot curved mirror mount screw 15. The blind spot curved mirror assembly is mounted on the two symmetrical piece mount adapter 20 using the blind spot curved mirror mount clamp 13 and blind spot curved mirror mount screws 14. The circular end of the two symmetrical piece mount adapter 20 is secured to object 21 an auxiliary frame to the original equipment mirror using universal mount adapter bolt 22 and universal mount adapter nut 23 for mounting on objects other than the original equipment mirror outer shell 17 and original equipment mirror reflector 18. FIG. 8 also shows the plane fields for FIG. 6 and FIG. 7.

Figure 9:
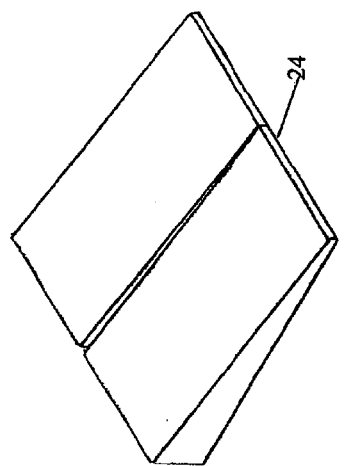
FIG. 9 is the universal mount two piece symmetrical adapter 20 and object 21 other than original equipment mirror 17.

FIG. 9 is the universal mount two symmetrical piece adapter 20 and object 21 as the other mount support than original equipment mirror outer shell 17 and the hole for the mount adapter screw 22.

Figure 10:
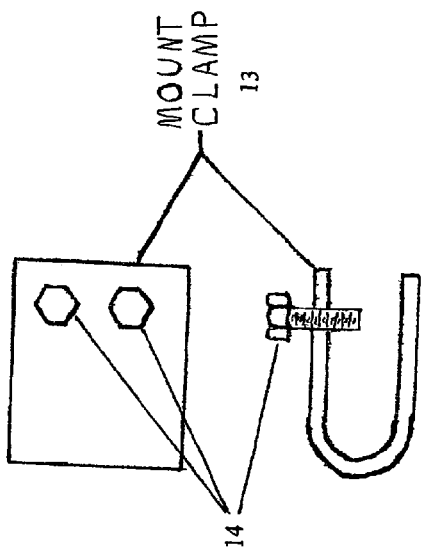
FIG. 10 is the blind spot curved mirror mount clamp 13 and blind spot curved mirror mount screws 14.

FIG. 10 is the blind spot curved mirror mount clamp 13 with threaded holes to match the threads on the blind spot curved mirror mount screws 14.

Figure 11:
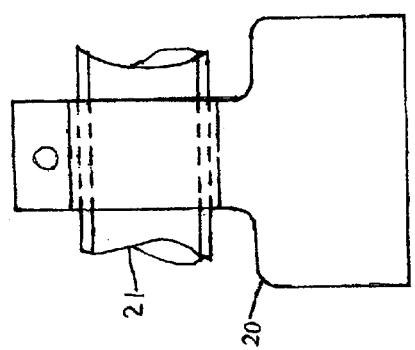
FIG. 11 is shim 24 made of flexible plastic used as leveling device to level and align the blind spot curved mirror outer shell 10 with original equipment outer shell 17.

FIG. 11 is shim 24 made of flexible plastic or other suitable material used as a leveling device to level and align the blind spot curved mirror outer shell 10 with original equipment outer shell 17 if needed. The shim 24 is under cut for ease of dividing where two shims are needed. All mirror outer shells are not flat on the surfaces therefor the shims may be needed to level and align the blind spot curved mirror outer shell 10 on that type mirror.

BLIND SPOT MIRROR ELEMENTS

10. Blind Spot Curved Mirror Outer Shell with a purpose of housing and protecting the working parts of the blind spot curved mirror and providing its mounting position. See FIGS. 1,2,3,4,6,7 and 8.

11: Blind Spot Curved Mirror Support and Positioning Socket with the purpose of providing a support and means for changing the viewing planes of the mirror reflector. See FIGS. 2,3,6 and 8.

12. Blind Spot Curved Mirror Positioning Ball and Stem for attaching and adjusting the blind spot curved mirror reflector 16 and blind spot curved mirror support and positing socket 11 to the blind spot curved mirror outer shell 10. See FIGS. 2,3 and 8.

13. Blind Spot Curved Mirror Mount Clamp with the purpose of mounting the blind spot curved mirror outer shell 10 to original equipment mirror outer shell 17 or other mounts 20. See FIGS. 1,2,3,8 and 10.

14. Blind Spot Curved Mirror mount clamp screw with a purpose of securing blind spot curved mirror mount clamp to outer shell 10 and original equipment outer shell 17 or universal mount 20. See FIGS. 2,3,8 and 10.

15. Blind Spot Curved Mirror Mount Screw with the purpose of securing the blind spot curved mirror reflector 16, the blind spot curved mirror support and positing socket 11 and the blind spot curved mirror positioning ball and stem 12 to the blind spot curved mirror outer shell 10. See FIGS. 2,3,7 and 8.

16. Blind Spot Curved Mirror reflector with the purpose of imaging the blind spot area of a vehicle driver and any object within the blind spot area to the vehicle driver. See FIGS. 1,2,3,5, and 8.

17. Original Equipment Side Mirror Outer Shell with a purpose of housing and protecting the side mirror. See FIGS. 1,2, and 3.

18. Original Equipment Side Mirror Reflector with the purpose of imaging a rear view area of the vehicle. See FIGS. 1,3 and 5.

19. A perspective view of how the blind spot curved mirror reflector 16 may be adapted with an original equipment side mirror 18 in a single outer shell. See FIG. 5.

20. A universal two symmetrical piece mount adapter for mounting the blind spot curved mirror on an object 21, other than original equipment side mirror outer shell 17 See FIGS. 8, and 9.

21. Object other than original equipment mirror shell 17, on which the blind spot curved mirror shell 10 may be mounted. See FIGS. 8 and 9.

22. Universal mount adapter mount bolt with purpose of securing the blind spot curved mirror shell 10 to objects other than original equipment mirror shell 19. See FIG. 8.

23. Universal mount adapter mount nut with purpose of securing the blind spot curved mirror shell 10 to objects other than original equipment mirror shell 19. See FIG. 8.

24. Is a shim for the purpose of leveling and aligning the blind spot curved mirror outer shell 10 with the original equipment side mirror outer shell 17 if needed on original equipment outer shell 17 during installation. See FIG. 11.

25. Mount Socket for properly aligning and installing the blind spot curved mirror positioning ball and stem 12 in blind spot curved mirror outer shell 10. See FIG. 3 and FIG. 8.

Having thus described the invention, what is described to be protected by Letters Patent is presented in the subsequently appended claims.

What is claimed is:

1. A retrofitted mirror apparatus comprising:

a mirror housing, wherein said mirror housing includes a mounting side and said housing is attachable at said mounting side to an existing external side-view mirror of a vehicle, said mirror apparatus aligned to enable a user positioned to have a forward view, to view objects in a opposing rearward adjacent blind spot area;

an obtusely angled portion removed from the mounting side to form an alignment indicium on said mounting side wherein said alignment indicium enables proper placement of the mirror apparatus on said existing external side-view mirror of the vehicle to form an effective angle in the horizontal plane, thereby being roughly and statically aimed into the blind spot area for reflecting images therein to said user;

said alignment indicium is recessed back from a forward most plane formed by the mirror housing;

said alignment indicium further including a center angle $\alpha$, said center angle $\alpha$ being in the range of about 136 degrees to about 176 degrees;

said alignment indicium further including an outer angle $\beta$ formed by the angle incident between a plane parallel to the forward most plane of the mirror housing and alignment indicium wherein said outer angle $\beta$ being in the range of about 2 degrees to about 22 degrees;

a curved reflecting means for reflecting to the user a view of objects in the blind spot area, comprising a reflective surface located in said forward most plane, wherein said reflective surface has a reflective side and a mounting side, said reflective surface being singly curved thereby having a vertical curved plane (top to bottom) and a straight horizontal plane (left to right);

and wherein said curved reflecting means reflects the view so as to show;

a true reflection of horizontal width size of the objects, a true reflection of horizontal position of the objects, and a wide angle vertical reflection of the objects, a mounting means for mounting and supporting said reflecting means in an approximately parallel position with respect to the forward plane, said mounting means having a first end onto which said reflecting means is affixed, and a second end;

a positioning means for positioning said mounting means and said curved reflecting means, wherein said positioning means pivotally attaches to said second end of said mounting means, allowing the observer to aim the curved reflecting means into the blind spot area; said attached positioning means, said mounting means, and said curve reflecting means further comprising an internal assembly; said internal assembly being disposed inside the mirror housing; and, further including an attachment means affixed to the mirror housing, wherein said attachment means joins the mirror housing to an existing external side-view mirror of a vehicle to enable a user to view via said retrofitted mirror apparatus.

* * * * *